United States Patent [19]
Bundo

[11] 3,817,308
[45] June 18, 1974

[54] METHOD OF PREPARING A WATER-SOLUBLE POWDER CONTAINING ACTIVE COMPONENTS FROM MINERAL SPRING WATERS OF SPAS AND PRODUCT PRODUCED THEREBY

[75] Inventor: Teruo Bundo, Beppu, Japan

[73] Assignee: Tokyo Yakuhin Kaihatsu Kabushiki Kaisha, Tokyo, Japan

[22] Filed: Feb. 21, 1973

[21] Appl. No.: 334,293

Related U.S. Application Data

[63] Continuation-in-part of Ser. No. 51,916, July 2, 1970, abandoned.

[30] Foreign Application Priority Data
Oct. 14, 1966  Japan.............................. 41-67113

[52] U.S. Cl.................... 159/48 R, 159/4 R, 159/3
[51] Int. Cl............................ B01d 1/16, F26b 3/12
[58] Field of Search.......... 159/4 R, 4 B, 4 C, 4 CC, 159/4 D, 4 E, 4 F, 4 K, 4 MS, 4 S, 4 SR, 4 VM, 48 R, 48 L, DIG. 20, 3; 99/199; 203/10, 11; 202/236

[56] References Cited
UNITED STATES PATENTS

| 390,616 | 10/1888 | Porter | 23/273 |
|---|---|---|---|
| 1,537,060 | 5/1925 | Beardslee | 99/199 |
| 2,532,924 | 12/1950 | Lesesne | 159/49 |
| 3,147,598 | 9/1964 | Wilson | 60/54 |
| 3,354,933 | 11/1967 | Wengeler | 159/48 R |
| 3,414,980 | 12/1968 | Nezbed | 34/9 |
| 3,432,258 | 3/1969 | Ferris | 23/91 |
| R23,608 | 12/1952 | Holland | 159/2 |

*Primary Examiner*—Jack Sofer
*Attorney, Agent, or Firm*—Sherman & Shalloway

[57] ABSTRACT

A method of preparing a water-soluble powder containing the water-soluble active components contained in a natural mineral spring water, which comprises adding a water-soluble assistant selected from the group consisting of excipients and protective colloids to the natural mineral spring water having a physiological spa effect as determined by the hydrogen peroxide decomposition property, $k_1/k_2$, of not less than about 1.3 and spray-drying the natural mineral spring water mixed with the assistant. The power obtained has essentially the same characteristics when mixed with water as the original spa water.

11 Claims, 1 Drawing Figure

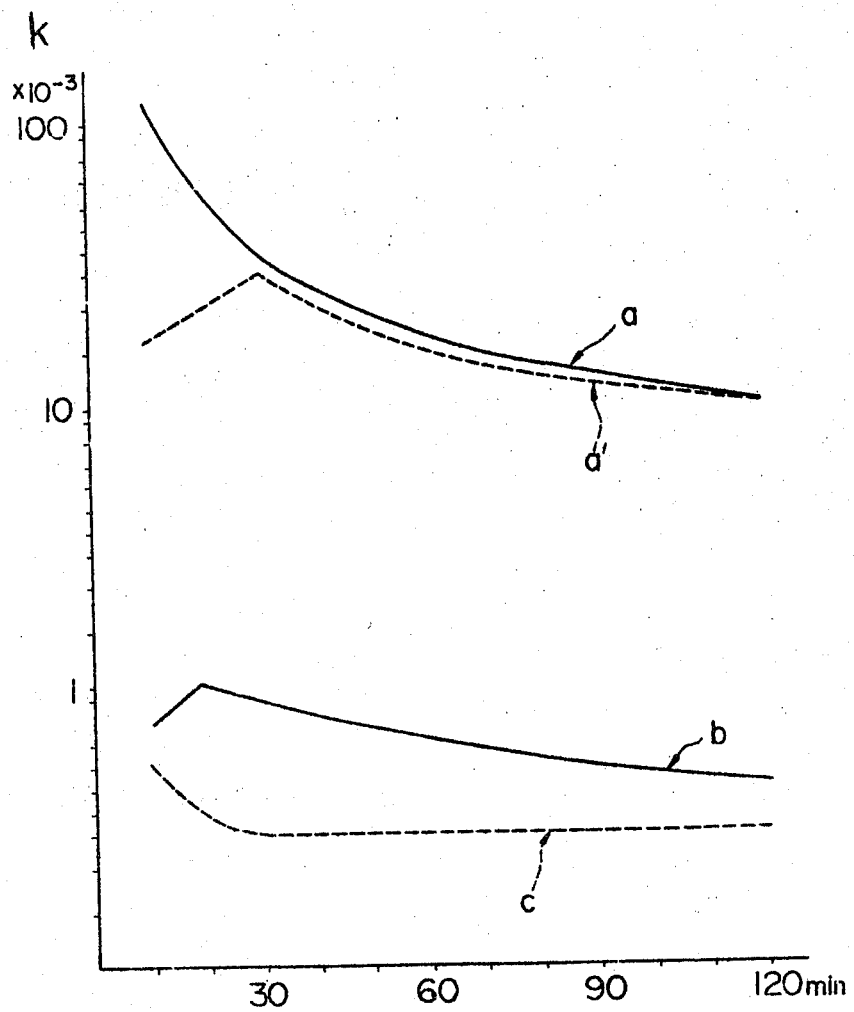

METHOD OF PREPARING A WATER-SOLUBLE POWDER CONTAINING ACTIVE COMPONENTS FROM MINERAL SPRING WATERS OF SPAS AND PRODUCT PRODUCED THEREBY

This application is a continuation-in-part of co-pending application Ser. No. 51,916, filed July 2, 1970, now abandoned.

This invention relates to a water-soluble powder and a method of preparing this water-soluble powder containing the natural components of mineral spring waters of spas while maintaining such natural components in their naturally active state — a thing which has not been attempted at all in the past. More specifically, the invention relates to a method of preparing a water-soluble powder which retains intact the physiological spa effects that are possessed by the natural mineral spring waters of spas, thermal and other type spas hereinafter referred to generically as natural mineral spring water or mineral spring waters of spas, and which demonstrates perfect solubility upon addition to cold or hot water and is capable of completely reproducing the state of a natural mineral spring water of a spa. Still more specifically, the invention relates to the preparation of the foregoing powder by a method comprising adding to the natural mineral spring water an assistant selected from the group consisting of excipients and protective colloids, and thereafter spray-drying the mineral spring water.

Compositions known as bath preparations or bath salts which are expected to promote blood circulation and enhance the metabolic process of the body have been known. Also, the sinter of spas, as obtained by sublimation and crystallization of the fumarolic vapor issuing from sulfur springs or as obtained by collecting and drying the sedimented slurry of spas, are known. The former is a man-made blend consisting of a suitable mixture of Glauber's salt, borax, sodium bicarbonate and sulfur, with which fragrance-imparting or coloring components are further blended. However, the composition of these salts differs greatly from the actual composition of the mineral spring waters which in their natural state not only are exceedingly complicated but also possess characteristics which have not yet been clarified. Further, the bath salts do not possess any of the physiologically effective activity of the mineral spring waters of natural spas. On the other hand, the sinter of spas is a product resulting either by separation or sublimation from the natural state of mineral spring water or, as hereinafter described, by destruction of the natural state of the mineral spring waters. Therefore, if its composition is considered, it merely contains a part of the natural spa components. Further the sinter of spas obtained by the sublimation and crystallization of fumarolic spa vapor and used for a long time as sinter of spas appears to be the product of the aging phenomenon of a hot spring, and it appears to be a product having no physiological spa effects, and particularly not the desirable spa effects and activity relating to health and therapy, which the mineral spring waters in their natural spa state possess.

While numerous attempts have been made to clarify the composition and state of equilibrium of the mineral spring water in its natural spa state, and especially the chemical and colloidal chemical equilibrium of the springs, as yet, these compositions and equilibria are still unknown. The impropriety of indicating the composition of a mineral spring water by listing its various inorganic salts has also been pointed out and, as a result, the method of indicating the composition by listing the components in the form of the various inorganic ions is being used.

In the aqueous system of mineral spring water in its natural spa state, which includes the dissolved or colloidally dispersed components or suspension of ultrafine particles, an exceedingly great number of classes of inorganic salts are in solution or dissociation or colloidally dispersed homogeneously therein. It is, moreover, conjectured that these salts have a mutual solubilizing action and in concomitance therewith are in an undetectably complex state of coexistance and equilibrium. In fact, it appears that the state of coexistance and equilibrium is readily destroyed by the mere cooling of the aqueous system of mineral spring water in its natural spa state and a coprecipitate of numerous classes of hydrates of inorganic salts or a precipitate which appears to be a non-clarifiable double-decomposed product is formed. This produces a change in the amount of the dissolved ions in the system. This change naturally brings about a shift of the above described complex state of coexistence and equilibrium to another and different state of equilibrium. Conversely when an attempt is made to concentrate the spa water by heating, similar precipitates are also formed. Moreover, these precipitates are also in most cases water-insoluble. In the formation of the mineral spring water of spas, the water elutes the underground mineral components in a complex manner, while under conditions of elevated temperature and high pressure, boils or again precipitates the once eluted components. This may be followed by various complicated chemical reactions which occur after the spring issues from the ground, resulting from the sudden release from the elevated temperature and pressure, the disappearance of the water's gaseous contents and its contact with air, rocks, minerals, soil and subterranean water or surface water. Also the springs are subjected to intense modifications, the details of which, are as yet unknown. For this reason the equilibrium and composition of the dissolved components in a mineral spring water of natural spas which is produced as set forth above is virtually undeterminable.

It is also known that minute quantities of metallic components, e.g. Ni, Mo and Se, or radium and radon are present in the mineral spring water of natural spas in a state referred to as metal enzyme whereby blemishes are removed in the springs natural state by the reduction of the melanin of the skin.

Further, since the state of the mineral spring water of spas is highly complicated, the facts concerning its activity, i.e., the catalytic action of a hot spring, are as yet not fully known. While chemically the springs catalytic action is indicated by using either the decomposition reaction of hydrogen peroxide or the benzidine reaction, these reactions do not necessarily completely correspond to or parallel the physiological spa effects. However, the ratio of hydrogen peroxide decomposition, $k_1/k_2$ as defined later, indicates the presence of physiological effects from mineral spring waters. These reactions, do however, serve as criterion showing the physiological activity of hot springs. This activity has a high value immediately after the issuance of the spa from the earth but diminishes very rapidly demonstrating the spa aging phenomenon.

On the other hand, it has been known for a long time that the waters of hot and mineral springs which naturally contain very many of the aforesaid not readily distinguishable, modification-susceptible substances in a complex state of coexistence and equilibrium, have physiological spa effects. Also the physiological spa effects of natural spring water containing the spa components in a wide variety of differing compositions have been known. Lately, these physiological spa effects are again attracting attention in the filed of medicine and hygiene, so that the physiological spa effects, principally the autonomic nerval effect, the thiol effect and cortcoid effect, might be used in medicine and hygiene. Also, reaserch has been made over a broad range including the therapy of radioactive lesions, etc.

However, when an aqueous system in a natural mineral water state is just concentrated, it is presumed that the readily changeable state of the mineral spring water readily loses its natural mineral spring water state as a result of chemical changes taking place. Even when the natural mineral spring water is heat condensed and the dissolved substances contained therein are precipitated, followed by analyzing the precipitate in order to learn all that can be possibly learned of the composition, the product obtained by blending these components artificially is no better than the sinter of spas. Thus, the natural mineral spring water state cannot possibly be reproduced. As a matter of fact, there has been no instance known of the physiological spa effects possessed by the natural mineral spring water, which is in a complex state of coexistence and equilibrium, having ever been achieved with such an artificially blended composition. In fact, the research in the field of hygiene and therapy in anticipation of the physiological spa effects is being carried out in all instances using the natural mineral spring waters. Again, the hot spring cure in anticipation of the physiological spa effects is carried out at the site of the natural mineral springs with the patient going to the spa to receive the treatment.

Accordingly, if a method could be discovered through which the natural mineral spring water components could be converted into a water-soluble powder which retains intact the natural activity of the mineral spring water and which reproduces the natural activity of mineral spring water by dissolving this powder in an aqueous system, these springs and spas could be reproduced at any place and at any time.

It is within the above environment and background that the process and composition of the present invention were developed. Briefly the process of the present invention comprises a method of preparing a water-soluble powder containing the water-soluble active components contained in the natural mineral spring water, which comprises adding a water-soluble assistant selected from the group consisting of excipients and protective colloids to the natural mineral spring water having a physiological spa effect as determined by hydrogen peroxide decomposition property, $k_1/k_2$, of not less than about 1.3 and spray-drying the natural mineral spring water mixed with this assistant. The powder has essentially the same characteristics when mixed with water as the original spa water.

Further, the product of the present invention comprises a spray-dried water-soluble powder retaining the physiological spa effects which includes a water-soluble assistant.

It is therefore the primary object of the present invention to provide a method of producing a water-soluble powder containing the natural mineral spring water components, which retains substantially intact the excellent physiological spa effects possessed by natural mineral spring waters, is substantially completely water-soluble, and can reproduce substantially the natural activity of natural mineral spring waters.

It is a further object of the present invention to provide a water-soluble solid composition which when mixed with water has substantially the same physiological effects as the original spring.

Other objects and advantages of the invention will become apparent from the following description.

As noted above, the substances contained in the mineral spring water in the natural state are in a state of multi-component aqueous equilibrium possessing conjointly a complex as well as mutually soluble and colloidal character and moreover are substances which react to the drying treatments in a unique manner so as to be readily modified physically, chemically and biologically during the drying operation. After drying, the dried mineral spring water components must also substantially retain their water solubility so as to ensure the reproduction of the original natural state of mineral spring waters. The treatment of the mineral spring water must be such that its unique activity which it possesses in its natural mineral spring water state is not completely lost. Now, even if the content of the inorganic ions is of identical composition analytically, the reproduction of the physiological spa effects is virtually impossible unless the multi-component system of the natural mineral spring water state can be reproduced. In addition, at present it is reported that the mere analogy of the results of chemical analysis is not directly correlated to the analogy of the physiological spa effects. In consideration of the foregoing points, it was completely impossible to predict which, if any, drying means from the numerous unit drying means and combinations thereof would produce a water-soluble product which when dissolved reproduces the physiological spa effects of the natural spring.

Further, since the amount of water to be removed from the intended components in the spa water is quite large, the chances of producing such a product appeared slight. As a matter of fact, there have been no reports wherein such components could be dried and retain the spa properties.

In light of the above heat concentration drying and heat-reduced pressure concentration drying techniques were first attempted using these methods, with the great amount of water to be removed, a considerable length of time was required to concentrate the natural mineral spring waters. Further, not only was there the fatal defect that water-insoluble metal salts were formed, but also the components separated starting with those which have the lowest solubility in water as the concentration increased. Also components which were not readily separable by concentration, including minute quantities of metallic components in a metal enzyme state, still remained in the aqueous system. This was due in part to the fact that this separation operation involved the treatment of a multi-component system liquid of complexity, as previously indicated. This made a continuous operation impossible and required that the complete drying operation be carried out batch by batch. It was thus found that these methods could not be commercially used for the treatment of natural mineral spring waters.

Accordingly, it was thought that the crystallizing out of the components would not take place and the relative positions among the several componential molecules would retain the natural mineral spring water state, if instead of the heating method the freeze-drying method was used since this method removes the moisture content by sublimation after freezing the mineral spring water. This technique was tried since it was thought it would become possible to restore even the components contained in minute quantities in the natural mineral spring water to a dispersed state identical to that of the original mineral spring water before its drying. It appears however that because of the previously described complex state of coexistence and equilibrium of the several components of the natural mineral spring water, the results were unsatisfactory. It was found that this method, in view of the equipment required and the heat loss as a result of the necessity of freezing mineral spring water having an elevated temperature, could not be practiced commercially for the treatment of natural mineral spring waters having a small percentage of active ingredients and having a large percentage of water. It was also found that this powder was not completely water-soluble since the natural state of the mineral spring water could not be reproduced.

On the other hand, completely unexpected results were obtained when the spray-drying method, i.e. spraying the mineral spring water into a heated atmosphere, was used. The powdered mineral spring water obtained by spray-drying the spa waters, in spite of the complex composition of the starting material, dissolved in hot water and reproduced the natural mineral spring water, possessing the characteristics of the starting mineral spring water since both heating and freezing were avoided.

In order to illustrate the various testing methods which indicate the presence of physiological spa effects a powder obtained by spray-drying the naturally issuing Arima Tenjin Spa (Kobe, Japan) water having a $k_1/k_2$ value of 1.7 is compared with the powders obtained by reduced pressure-heat drying and freeze drying of this same water. Each of these was tested for its benzidine reaction, water solubility and color when redissolved in water, with the results shown in Table I, below. In Table I the results of the natural spa water and those of the sinter of natural spas are shown together.

Further, a test for the hydrogen peroxide decomposition property was also conducted with the results in the drawing.

Test Methods

A. Benzidine reaction

The sample in an amount corresponding to the solids content of the starting spring water is added to one liter of distilled water at room temperature. Some 10 ml of the resulting solution are placed in a test tube, and 5 ml of a saturated acetic acid solution of benzidine and 5 ml of 3 percent hydrogen peroxide solution are added thereto. Following this addition the appearance of benzidine blue is observed.

The following symbols are assigned.

That which is not clearly discernible due to combination with the yellowish brown color resulting from oxidation of iron . . . ±
That which is clearly evident . . . +
That which is intense . . . . ++
That which is exceedingly intense . . . +++

B. Hydrogen peroxide decomposition property

The powder sample is dissolved in 60°C. distilled water. To 200 ml of this solution 5 ml of 1 percent hydrogen peroxide solution are added following which the combined solution is stored in a 60°C. constant temperature tank, from which 10 ml thereof are withdrawn successively at hourly intervals. Two ml of 20 percent sulfuric acid are added to the withdrawn solutions and titrated with 0.04 percent potassium permanganate solution. The amount of the potassium permanganate solution consumed immediately after addition of the hydrogen peroxide solution is designated $a$ ml, and the amount of potassium permanganate solution corresponding to the hydrogen peroxide decomposed up to $t$ minutes is designated $x$ ml. The speed constant, $k$, is obtained by substitution of the obtained values in the following equation of the primary reaction.

$$k = (1/t) \log (a/a-x)$$

The elapsed time and the respective k values are plotted to illustrate the relationship graphically.

On the other hand, the solubility is determined by observing the solubility of the sample in preparing the solution in the hereinbefore described test (A). Those samples wherein an appreciable amount of undissolved portion remains are termed insoluble, those which dissolve completely and in which an appreciable amount of undissolved portion does not remain are termed difficultly soluble, and those wherein the dissolution proceeds promptly are termed readily soluble. Further, the color of this solution is determined by an examination of the solution with the naked eye.

C. To 200 ml of the raw material natural mineral spring water 5 ml of a 1 percent hydrogen peroxide solution are added. Immediately after the addition, the above-described hydrogen peroxide solution is added. Ten ml of spring water are introduced in a beaker, 2 ml of 20 percent sulfuric acid are added and titrated with a 0.04 percent potassium permanganate solution. The amount ($a$ ml) of the potassium permanganate solution consumed is measured.

The rest of the spring water with the hydrogen peroxide solution is stored in a constant-temperature oven at 60°C. after the sampling of the above 10 ml of spring water.

Ten ml of the stored spring water is sampled after 5 min. and 10 min., respectively and the amounts $x_1$ ml and $x_2$ ml of the potassium permanganate solution consumed are measured. The speed constants, $k_1$, $k_2$ are calculated from the measured values by the following formula:

$$k_1 = (1/5) \log a/(a - x_1)$$

$k_2 = (1/10) \log a/(a - x_2)$ The "decrease ratio of the hydrogen peroxide decomposition property" is represented by $k_1/k_2$ and as used herein may be defined as the ratio of the "speed constant" of the above stored spring water after five minutes ($k_1$) of storage compared to the "speed constant" after 10 minutes ($k_2$) of storage.

TABLE I

| Test | Natural spring water as-obtained | Present invention (1)[a] | Present invention (2)[b] | Reduced pressure heat drying | Freeze drying | Sinter (Nasu Spa) |
|---|---|---|---|---|---|---|
| Water-solubility | | Soluble | Readily soluble | Difficultly soluble (abt. 20 wt. percent insoluble portion.) | Difficultly soluble (abt. 25 wt. percent insoluble portion.) | Water-insoluble. |
| Color of liquid | Colorless and transparent. | Light yellow and transparent. | Colorless and transparent. | Yellowish brown and semi-turbid. | Yellowish brown and semi-turbid. | |
| Benzidine reaction | +++ | ++ | +++ | + | ± | ± |

[a] Spray-dried the as-obtained natural spring water.
[b] Spray-dried after addition of lactose.

NOTE.—The sample solution was prepared by adding 70 grams of the sample to one liter of distilled water.

It is seen from the results presented in Table I, above, that the solubility, color and activity, as determined by the benzidine reaction of the natural mineral spring water, is reproduced substantially intact in the case of the treatments according to the method of the present invention, whereas it is no longer possible to reproduce the state of the original natural mineral spring water in the case of the other drying techniques.

In the accompanying drawing, the changes in the hydrogen peroxide decomposition property, $k$, with the passage of time of the powders upon redissolution are shown for the powder of the present invention, which was obtained by spray-drying the Arima Tenjin Spa water after addition thereto of lactose as an excipient (curve $a'$), the powder obtained by heat-reduced pressure drying (curve $b$) and the powder obtained by freeze drying (curve $c$), as well as the changes in this property for the as-obtained natural Arima Tenjin Spa water. Further the $k_1/k_2$ value of the spray-dried product as shown in curve $a'$ is also 1.7, the same as the original untreated spa water. It should be apparent from this drawing also that the powder obtained in accordance with the invention method reproduces the original, natural mineral spring water state with practically no deterioration of its original state, whereas the reproduction of the natural mineral spring water state was no longer possible in the case of the products obtained by the reduced pressure drying or freeze-drying.

Twenty milligrams of a water-soluble powder containing the components of natural Arima Tenjin Spa water (610 micrograms of iron content) were dissolved in two milliliter of physiological saline, after which this was introduced into a white rat intestine (about 20 cm) formed into a bag. This was followed by immersing this intestine in physiological saline, incubation at 37°C., and measurement of the iron ($Fe^{++}$) that migrated from the inside of the intestine to the physiological saline on the outside, thereby testing the intestinal absorption property. By way of comparison, a completely identical test was also carried out on the powder obtained by heat-reduced pressure concentration and that obtained by freeze-drying. As shown in Table II, below, it was found that there was a marked difference in the speed and amount at which the invention product was absorbed through the intestinal wall as compared with the products which were powdered by the other methods. When this is considered along with the fact that the starting spa water (Arima Tenjin Spa) used was one of exactly the same composition, the results obtained were completely unexpected. In Table II the results obtained when the untreated starting spa water was also tested are shown by way of comparison.

TABLE II

AMOUNT OF IRON ($Fe^{++}$) MIGRATION ($\mu g$)

| | After Incubation for 15 Minutes | After Incubation For 30 Minutes |
|---|---|---|
| Invention product | 42 | 93 |
| Heat-reduced pressure concentrated product | 6 | 10 |
| Freeze-dried product | 8 | 21 |
| Starting spa water * | 45 | 101 |

*Used after dilution with physiological saline such that the iron content of the starting spa water becomes 610 micrograms per 2 milliliters.

In natural mineral spring water regarded as having physiological spa effects as defined in the present invention, the percent migration of $Fe^{++}$ after incubation for 30 min. (a percentage by weight of $Fe^{++}$ migrated relative to $Fe^{++}$ contained in the original spa water) IS NOT LESS THAN ABOUT 5 percent in an absorption test through an intestinal wall. It is desirable in the present invention to use raw material spa water having not less than about 5 percent, preferably not less than about 10 percent of the percent migration.

As shown by the results presented in Table II and the accompanying drawing, it can be seen that a mineral spring water powder which is capable of reproducing nearly completely the state of dissolution and activity of the starting natural mineral spring water can be obtained according to the method of the present invention. Furthermore, the resulting powder, differing from the artificially blended products, not only contains substantially completely the several components that are contained in the starting natural mineral spring water, but also the powdered product contains the several components nearly homogeneously no matter which part thereof is taken. Further, not only is the continuous treatment made possible, but also the heat possessed by the mineral spring water itself can be utilized directly in the spray-drying operation to make the spray-drying method itself exceedingly advantageous. In addition, by installing the apparatus in the vicinity of the spa from which the starting mineral spring water is obtained and by utilizing the heat of the spa, the heat of the spa can be relied on for providing a major portion of the heat required for accomplishing the drying operation.

The starting material for the process and composition of the present invention comprises a natural mineral spring water having an eruption temperature of 15°C. and above and preferably above 25°C., and a decrease ratio $k_1/k_2$ not less than 1.3, preferably not less than 1.5 and most preferably not less than 1.6. Typical examples of classified names of the natural mineral spring waters having physiological spa effects of not less than 1.3 determined by the decrease ratio $k_1/k_2$, diseases for which the spring is effective and their uses are given in Table A.

effects possessed by the mineral spring water in its natural state. While the extent to which this concentration is to be carried out differs depending upon the class of the starting mineral spring water, usually a concentra-

TABLE A-(1)

|  | Digestive ailment | Liver, gall trouble | Rheumatism | Joint trouble | Nerve trouble | Neurosis nerve | Blood circulation diseases | Respiratory organ diseases | Diabetes | Obesity |
|---|---|---|---|---|---|---|---|---|---|---|
| Simple thermal springs |  |  |  | O |  | O | O | O |  |  |
| Simple carbonated springs | ● |  | O |  | O | O | O | ● |  |  |
| Earthy carbonated springs | ● |  | O |  | O | O● |  | ● |  |  |
| Alkali carbonated springs | ● | ● | O |  | O |  |  | △ | ● | ● |
| Common salt springs | ● |  | O |  | O | O● |  | △ | ● | ● |
| Sulfate springs | ● | ● | O |  | O | O● | ● | ● | ● | ● |
| Iron carbonate spring |  |  | O |  | O● |  |  |  |  |  |
| Alum springs |  |  |  |  |  |  |  |  |  |  |
| Sulfur springs | O |  | O● |  | O● |  | O | ● | O● |  |
| Acid springs |  |  | O |  |  |  |  |  |  |  |
| Radioactive springs | O● | O● | O●△ | O | O●△ |  | O | △ |  |  |

TABLE A-(2)

|  | Gout | Anemia | Women's diseases | Kidney trouble | Penis diseases | Skin diseases | Wound | Metal poisoning | Convalescence | Rehabilitation |
|---|---|---|---|---|---|---|---|---|---|---|
| Simple thermal springs |  |  |  |  |  | O |  |  | O |  |
| Simple carbonated springs | O | O |  | ● | O |  |  |  |  |  |
| Earthy carbonated springs | O● |  |  | ● |  | O | O |  |  |  |
| Alkali carbonated springs | ● |  | O | ● |  |  | O |  |  | O● |
| Common salt springs | O | ● |  |  |  | O | O |  |  | O● |
| Sulfate springs | O |  |  |  |  | O | O |  |  |  |
| Iron carbonate spring |  | ● | O● |  | O | O |  |  | ● |  |
| Alum springs |  |  |  | O | O | O | O |  |  |  |
| Sulfur springs | ● |  | O |  |  | O |  | O |  |  |
| Acid springs |  |  |  |  |  | O |  |  |  |  |
| Radioactive springs | O●△ | O |  |  |  | O | O |  | O |  |

O = Bathing.  ● = Drinking.  △ = Inhaling.

Since the spray-drying technique is well-known, a detailed description thereof will not be made. This technique consists of spraying the starting mineral spring water into a spray-drying chamber while blowing hot air thereinto. While the temperature of hot air blown into the chamber is not particularly critical, a temperature on the order of 100° to 200°C. is usually employed. It is particularly preferred that the hot air flow is so controlled that the temperature of the chamber is about 80°–130°C.

When practicing the method of the present invention near the spring, the temperature and amount of the hot air can be reduced considerably, since the starting mineral spring water itself possesses heat.

In view of the fact that the natural mineral spring water exhibits an aging phenomenon after its issue, a particular characteristic of the present method consists in conducting the spray-drying treatment before a decline takes place in various physiological and chemical activities of the mineral spring water. While this aging phenomenon differs depending upon the class of the mineral spring water, in any event the spray-drying treatment must be carried out as soon as possible before the disappearance of its activities generally within 100 hours, and preferably 50 hours after eruption.

In the present method, the yield is improved when the mineral spring water components contained in the starting mineral water are concentrated in advance of the spraying of the water. Therefore, this procedure is preferred. In carrying out this concentration, a concentration to such an extent that causes a substantial change in the composition of the components in the starting mineral spring water by the separation of solids content in a substantial amount must be avoided. In short, the concentration before spraying of the starting mineral spring water is best done to an extent that does not result in the loss of the desirable physiological spa effects possessed by the mineral spring water in its natural state. While the extent to which this concentration is to be carried out differs depending upon the class of the starting mineral spring water, usually a concentration of the water such that the content of the components to be solidified is on the order of 1 to 10 percent by weight of the starting mineral spring water is satisfactory. Natural springs having mineral content exceeding the foregoing range need not be concentrated.

The composition and method of the present invention includes an assistant selected from the group consisting of excipients and protective colloids which is to be added to the natural mineral spring water prior to spray-drying. As utilized in the instant specification and claims, the term "excipient" means an inert carrier for a medicinal agent and the term "protective colloid" means a substance which promotes the stability of the colloidal state by enveloping the particles.

The use of such an assistant, as previously shown in the case of (2) of Table I and in the drawing, demonstrates an improvement in the reproducibility of the natural mineral spring water state, over the case where the spray-drying treatment is carried out on the as-issued spring water without the use of the foregoing assistant. Further advantages that are had by using the foregoing assistant include the following: the dust collecting property is improved when collecting the resulting powder with a dust collecting apparatus; the possibility of the formation of insoluble precipitates during the concentration steps can be prevented when the natural mineral spring waters whose content of solidifiable components is small are submitted to a concentration treatment in advance of their spray-drying treatment, the powdering of spring water having a maximum content of free acids is also facilitated; and the hygroscopicity and perishability of the resulting powder are removed and prolonged periods of storage are possible.

Various assistants can be used as such excipients and protective colloids. If a water-soluble excipient is used, the resulting powder can be wholly redissolved in water. On the other hand, when one which is water-insoluble is used, the form-imparting agent contained in the resulting powder will not dissolve in water, of course, but the active components of the natural spring water making up the powder will redissolve completely in water.

Specific examples of the excipient, include such water-soluble excipients as the water-soluble carbohydrates i.e. lactose, water-soluble starch and hydrolytic products of starch; water-soluble sulfates of the metals of Groups I–III of the periodic table, i.e. sodium sulfate, magnesium sulfate and aluminum sulfate; alkali metal carbonates i.e. potassium carbonate and sodium carbonate; alkali metals bicarbonates i.e. sodium bicarbonate; sodium chloride; and borax.

Examples of the finely divided, water-insoluble excipients, include starch, diatomaceous earth, kaolin, talc, clay, montmorillonite, aluminum silicate, active carbon and vegetable fiber powder.

On the other hand, the protective colloids include the natural pastes such as gum arabic and tragacanth gum; the cellulose derivatives such as methyl cellulose, carboxy methyl cellulose and the alkali metal salts thereof; calcium gluconate and sodium alginate; and proteins, proteolytic products, amino acids and the alkali metal salts thereof, such as albumin, globulin, lysine, taurine, water-soluble polypeptides, sodium glutamate and sodium aminosuccinate.

These assistants selected from the group consisting of the excipients and protective colloids may be used in the natural mineral spring water without any particular restrictions so long as spray-drying of the water is possible, but usually from 1 to 50 percent and preferably 1 to 30 percent by weight of assistant is used. In general, when the components to be solidified in the natural mineral spring water are in a minute quantity or when the amount of free acids is great, the amount of the assistant used is preferably increased.

Also, additional excipient may be added to the spray-dried powder. Further, the resulting powder may also have other medicinally effective ingredients, perfumes, coloring matter and colloid stabilizers, included if desired.

The powder of the invention reproduces the natural mineral spring water state without exhibiting any insolubility phenomenon.

The powder of the present invention can be called solid natural mineral spring water and can be used both internally and externally for such purposes as health and hygiene as well as cure and prevention of diseases and also as an auxiliary therapeutic means. It is also a very excellent bath preparation, and the reproduction of the desired natural mineral spring bath at any place and at any time is possible. Again, it may be blended with cosmetic bases to make beautifying or medicinally effective cosmetics for facial treatments and the removal of blemishes. In addition, cosmetics for pack use can be made by the addition of the hereinbefore described water-insoluble excipient in carrying out the spray-drying operation. Alternatively, it can be used as an aqueous mineral beverage by blending or not blending with other beverage ingredients and, as required, by the addition of alkali metal salts of carboxy methyl cellulose, lactose, etc.

In the case of its use as a bath preparation, an addition on the order of 0.001 to 10 percent of the bath liquid is usually sufficient. When it is to be taken orally, an amount on the order of 0.05 to 10 grams per 50 kg of body weight is sufficient. On the other hand, when used for cosmetic purposes, an amount on the order of 0.01 to 1 percent of the weight of the base is sufficient. However, these amounts will vary depending upon the class of the starting mineral spring water.

In any event, the powder obtained by the invention method is a product not paralleled at all by any known in the past in that it retains substantially intact the excellent physiological spa effects of the natural mineral spring water as well as adequate solubility enabling the powder to reproduce substantially completely the original state of the starting mineral spring water.

The process and composition of the present invention will now be more fully illustrated by the following examples. These examples are for the purposes of illustration only and are in no way to be taken as limiting.

EXAMPLE 1

One hundred liters of 85°C. hot spring water ($k_1/k_2 \approx 1.9$) of the fountainhead of the Kanawa Sea Geyser, Beppu, Japan were concentrated to 10 liters, an extent which did not precipitate any insoluble matter, using a continuous vacuum concentrating apparatus. The concentrated mineral spring water, with 125 g lactose added, (referred to as concentrated mineral spring water) was spray-dried with hot air at 140°C. made by passing through a heat exchanger the vapor of the foregoing geyser (100°C.) after having heated same to 150°C., to obtain a grayish white powder in an amount of 495 grams.

The spectrum analysis of the obtained powder was conducted after diluting same with distilled water until a 3300 mg/kg solution was obtained. The results are shown below.

| | mg/kg | | mg/kg |
|---|---|---|---|
| $H^+$ | 6.25 | $Cl^-$ | 1081.0 |
| $K^+$ | 172.0 | $HSO_4^-$ | 293.3 |
| $Na^+$ | 685.0 | $SO_4^{2-}$ | 705.5 |
| $NH_4^+$ | 0.231 | $H_2PO_4^-$ | 0.553 |
| $Ca^{2+}$ | 93.54 | $HCO_3^-$ | 0.021 |
| $Mg^{2+}$ | 10.112 | $H_2SO_4$ | 4.658 |
| $Fe^{2+}$ | 2.103 | $H_3PO_4$ | 0.330 |
| $Fe^{3+}$ | 4.175 | $HAsO_2$ | 0.265 |
| $Mn^{2+}$ | 6.853 | $H_2SiO_3$ | 418.0 |
| $Al^{3+}$ | 1.957 | $HBO_2$ | 55.89 |

Thus, the resulting powder showed a composition practically indentical to that of the natural sea geyser water, and when 15 grams of this powder were added to 150 liters of hot water, it dissolved completely therein and provided a warming hot bath which possessed the characteristics peculiar to a sea geyser. Its benzidine reaction, $k_1/k_2$ and hydrogen peroxide decomposition property were practically identical to those of the starting hot spring water.

EXAMPLE 2

When the spray-drying operation was carried out as in Example 1 after addition and dissolution in 10 liters of the concentrated spring water of Beppu Sea Geyser of Example 1, 1.5 kg of sodium sulfate, 1.75 kg of a free flowing, white powder was obtained.

When bathing was carried out in a hot bath of 200 liters of tap water in which 20 grams of the above product were introduced, not only was the warming effect adequate but also a tactile sensation and effect such as had when bathing in a natural spa was experienced.

Further, the benzidine reaction and decrease ratio of hydrogen peroxide decomposition property were comparable to those of the starting spring water.

EXAMPLE 3

One hundred liters of hot spring water ($k_1/k_2 \approx 2.1$) taken from the fountainhead of Daifuku Hotel spa located along Seashore Avenue of Beppu were concentrated under reduced pressure until the volume became 30 liters. When this was spray-dried as in Example 1 after dissolving 0.1 kg of lactose, 0.2 kg of borax and 0.2 kg of sodium sulfate therein, 0.565 kg of a white powder was obtained. The benzidine reaction and $k_1/k_2$ were comparable to the values of the starting spring water.

EXAMPLE 4

Three kg of lactose and 3 kg of sodium sulfate were dissolved in 100 liters of 98°C. hot water ($k_1/k_2 \approx 1.5$) obtained at the fountainhead of Tatsumaki Geyser of Kanawa, Beppu, followed by conducting the spray-drying operation as in Example 1 to obtain 6.15 kg of a white powder. This was then made into a bath preparation by mixing therewith 30 grams of jasmine perfume and 6 grams of a blue pigment. When 15 grams of this product were dissolved in a bath containing 150 liters of tap water heated at 40°C., a clear, fragrant hot spring bath of blue color was obtained. The benzidine reaction and $k_1/k_2$ were comparable to the values of the starting spring water.

EXAMPLE 5

After dissolving 3.15 kg of lactose in 100 liters of 85°C. hot spring water ($k_1/k_2 \approx 1.9$) of the Kanawa Sea Geyser, Beppu, the water was spray-dried, whereupon 3.18 kg of a water-soluble white powder containing about 10 percent of the Sea Geyser spring powder were obtained. 3.3 Grams of the above product were dissolved in 100 ml of distilled water, weighed and analyzed. The results obtained showed that the composition and $k_1/k_2$ of this product were identical the natural Sea Geyser water.

EXAMPLE 6

Three kg of sodium sulfate, 1.2 kg of sodium chloride and 5.5 kg of lactose were dissolved in 100 liters of the hot spring water ($k_1/k_2 \approx 1.8$) of Kanawa Sea Geyser, Beppu, following which this solution was spray-dried to obtain 9.3 kg of a white powder containing about 4 percent of the Sea Geyser spring powder.

EXAMPLE 7

After adding 7.1 grams of lactose to 100 liters of the Aruma Tenjin Spa water, the water was spray-dried, whereupon 13.3 kg of a stable, white powder containing about 50 percent of the dried components of Arima Tenjin Spa were obtained.

EXAMPLE 8

When 100 liters of the spring water of Misasa Spa Sanatorium, Tottori Prefecture, Japan were spray-dried after dissolving 4.85 kg of lactose therein, 4.95 kg of a stable, white powder containing about 3 percent of the spa components were obtained.

EXAMPLE 9

One hundred liters of the water of Hakuro Bathhouse of Misasa Spa were concentrated to one-fifth of its original volume, followed by dissolving 1.0 kg of sodium chloride and 1.0 kg of sodium bicarbonate therein. When this solution was spray-dried, a stable, water-soluble, white powder containing radium was obtained in an amount of 3.45 kg.

EXAMPLE 10

Ten kg of lactose and 0.2 kg of lysine were dissolved in 100 liters of the mineral spring water of Masutomi Village, Yamanashi Prefecture, Japan, after which the solution was spray-dried, whereupon a stable, water-soluble, white powder in an amount of 9.8 kg, containing about 10 percent of the dried components of Masutomi Mineral Spring was obtained.

EXAMPLE 11

In 100 liters of the water of Tsukahara Mineral Spring, Beppu were dissolved 10.5 kg of lactose and 0.3 kg of a composite amino acid liquid (product of Ajinomoto Co., Ltd., Japan), after which the solution was spray-dried, whereupon a water-soluble powder in an amount of 11.5 was obtained. Seven grams of this product contains about one gram of the components of the mineral spring water.

EXAMPLE 12

After dissolving 3 kg of sodium sulfate and 3 kg of PINEDEX (product of Matsutani Chemical Company, Japan, a hydrolytic product of starch) in 100 liters of 98°C. hot water of the fountainhead of Tatsumaki Geyser of Tetsurin, Beppu, the solution was spray-dried to obtain 6.15 kg of a white powder.

EXAMPLE 13

When 4.0 kg of lactose and 5 grams of gum arabic were dissolved in 100 liters of the mineral spring water of Misasa Spa Sanatorium and the solution was spray-dried, 4.15 kg of a white powder were obtained.

We claim:

1. A method of preparing a water-soluble powder containing the water-soluble active components contained in natural mineral spring waters, which comprises adding a water-soluble assistant selected from at least one of the group consisting of water-soluble hydrocarbons, water-soluble sulfates of the metals of Groups I – III of the periodic table, alkali metal carbonates, alkali metal bicarbonates, sodium chloride, borax, starch, diatomaceous earth, kaolin, talc, clay, montmorillonite, aluminum silicate, active carbon, vegetable fiber powder, gum arabic, tragacanth gum, methyl cellulose, alkali metal salts thereof, carboxymethyl cellulose, alkali metal salts thereof, calcium gluconate, alkali metal salts of alginic acid, albumin, globulin, lysine, taurine, water-soluble polypeptides, alkali metal salts of glutamic acid and alkali metal salts of aspartic acid to said natural mineral spring water having a physiological spa effect of not less than about 1.3 as determined by the decrease ratio [$K_1/K_2$] of the hydrogen peroxide decomposition property, and spray-drying said natural mineral spring water mixed with said assistant.

2. The method of claim 1, wherein the decrease ratio, $k_1/K_2$ is not less than 1.5.

3. The method of claim 1 in which the natural mineral spring water is concentrated to the point where its solids content is from about 1 to about 10 percent, prior to spray-drying.

4. The method as set forth in claim 1, wherein said water-soluble assistant is incorporated in an amount of 1 to 50 percent by weight based on the weight of the natural mineral spring water.

5. The method of claim 4 wherein said assistant comprises 1 to 30 percent by weight.

6. The method as set forth in claim 1 wherein the natural mineral spring water is dried within 100 hours after eruption.

7. The method as set forth in claim 6 wherein the natural mineral spring water during eruption has a temperature of 15°C. or above.

8. The method of claim 6 wherein said water is dried within 50 hours.

9. The method as set forth in claim 1, wherein said spray-drying is conducted under the conditions under which the temperature of hot air blown into the spray-drying zone ranges from about 100°C. to about 200°C.

10. The method of claim 9 in which the temperature is from about 80 to about 130°C.

11. A spray-dried water-soluble powder consisting essentially of water-soluble active components contained in a natural mineral spring water and said components retain their physiological spa effects possessed by said natural mineral spring water, and a water-soluble assistant selected from at least one of the group consisting of water-soluble hydrocarbons, water-soluble sulfates of the metals of Groups I – III of the periodic table, alkali metal carbonates, alkali metal bicarbonates, sodium chloride, borax, starch, diatomaceous earth, kaolin, talc, clay, montmorillonite, aluminum silicate, active carbon, vegetable fiber powder, gum arabic, tragacanth gum, methyl cellulose, alkali metal salts thereof, carboxymethyl cellulose, alkali metal salts thereof, calcium gluconate, alkali metal salts of alginic acid, albumin, globulin, lysine, taurine, water-soluble polypeptides, alkali metal salts of glutamic acid and alkali metal salts of aspartic acid.

* * * * *

UNITED STATES PATENT OFFICE
CERTIFICATE OF CORRECTION

Patent No. 3,817,308          Dated June 18, 1974

Inventor(s)          TERUO BUNDO

It is certified that error appears in the above-identified patent and that said Letters Patent are hereby corrected as shown below:

In column 12, line 48: cancel "indentical" and substitute -- identical --

In column 14, line 60: cancel "$[K_1/K_2]$" and substitute -- $[k_1/k_2]$ --

In column 14, line 65: cancel "$k_1/K_2$" and substitute -- $k_1/k_2$ --

Signed and sealed this 8th day of April 1975.

(SEAL)
Attest:

RUTH C. MASON
Attesting Officer

C. MARSHALL DANN
Commissioner of Patents
and Trademarks